United States Patent [19]
Rabinovich et al.

[11] Patent Number: 5,884,227
[45] Date of Patent: Mar. 16, 1999

[54] METHOD FOR INTERPRETING INDUCTION LOGS IN HIGH RESISTIVITY CONTRAST EARTH FORMATIONS

[75] Inventors: Michael B. Rabinovich; Leonty A. Tabarovsky, both of Houston, Tex.

[73] Assignee: Western Atlas International, Inc., Houston, Tex.

[21] Appl. No.: 831,740

[22] Filed: Apr. 1, 1997

[51] Int. Cl.[6] .................................................. G06F 19/00
[52] U.S. Cl. ...................................................... 702/7
[58] Field of Search ........................... 702/7, 9; 324/335, 324/339–343

[56] References Cited

U.S. PATENT DOCUMENTS

| 5,666,057 | 9/1997 | Beard et al. | 324/339 |
| 5,698,982 | 12/1997 | Mitchell et al. | 324/339 |
| 5,703,773 | 12/1997 | Tabarovsky et al. | 702/7 |

OTHER PUBLICATIONS

T. Tamarchenko and L. Tabarovsky, Fast Frequency Domain Electromagnetic Modeling in Axially Symmetric Layered Media, Radio Science, vol. 29, No. 4, pp. 979–992, Jul.–Aug. 1994.

Primary Examiner—Donald E. McElheny, Jr.
Attorney, Agent, or Firm—Richard A. Fagin

[57] ABSTRACT

A method of adjusting induction receiver signals for skin effect in an induction logging instrument including a plurality of spaced apart receivers and a transmitter generating alternating magnetic fields at a plurality of frequencies. The method includes the steps of extrapolating magnitudes of the receiver signals at the plurality of frequencies, detected in response to alternating magnetic fields induced in media surrounding the instrument, to a response which would obtain at zero frequency. A model of conductivity distribution of the media surrounding the instrument is generated by inversion processing the extrapolated magnitudes. Magnitudes of the receiver responses at the plurality of frequencies are synthesized based on the model of conductivity distribution. A difference between the synthesized magnitudes and the measured magnitudes is determined; the difference is used to correct the measured magnitudes and the steps of extrapolating, generating the model based on the extrapolated magnitudes and determining the difference are repeated until the difference represents less than a predetermined fraction of the measured magnitudes.

10 Claims, 3 Drawing Sheets

METHOD FOR INTERPRETING INDUCTION LOGS IN HIGH RESISTIVITY CONTRAST EARTH FORMATIONS

BACKGROUND OF THE INVENTION

1. Field of the Invention

The invention is related to the field of electromagnetic induction well logging for determining the resistivity of earth formations penetrated by wellbores. More specifically, the invention is related to methods for determining the most likely values of resistivity of the earth formations when the formations have highly conductive layers proximal to low conductivity layers.

2. Description of the Related Art

Electromagnetic induction resistivity instruments are used to determine the electrical conductivity of earth formations surrounding a wellbore drilled through these formations. An electromagnetic induction well logging instrument is described, for example, in U.S. Pat. No. 5,452,761 issued to Beard et al. The instrument described in the Beard et al '761 patent includes a transmitter coil and a plurality of receiver coils positioned at axially spaced apart locations along the instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument.

As is well known in the art, the magnitude of the signals induced in the receiver coils is related not only to the conductivity of the surrounding media (earth formations) but also to the frequency of the alternating current. At higher alternating current frequencies, the signals induced in the receiver coils are generally smaller than the signals which are induced at lower frequencies because of the so-called "skin effect". Worse still, the magnitude of the skin effect is also related to the conductivity itself at any particular frequency. While it would appear that merely reducing the frequency of the alternating current would reduce the skin effect in the resulting measurements, it is also known in the art that the magnitude of the induced signals in the receiver coils is proportional to the frequency of the alternating current. Using higher frequencies is desirable in order to enhance the accuracy with which the conductivity can be determined which the conductivity is small.

An advantageous feature of the instrument described in the Beard et al '761 patent is that the alternating current flowing through the transmitter coil includes a plurality of different component frequencies. Having a plurality of different component frequencies in the alternating current makes possible more accurate determination of the apparent conductivity of the media surrounding the instrument by using various methods of estimating the induced signal magnitude that would be obtained in the various receiver coils if the frequency of the alternating current were zero.

One method for estimating the magnitude of signals that would obtain at zero frequency is described, for example, in U.S. patent application Ser. No. 08/608,731 filed by Beard et al on Feb. 29, 1996, now U.S. Pat. No. 5,666,057, and entitled, "Method for Skin Effect Correction and Data Quality Verification for a Multi-Frequency Induction Well Logging Instrument". The method in U.S. Pat. No. 5,666,057 in particular, and other methods for skin effect correction in general, are designed only to determine skin effect corrected signal magnitudes, where the induction logging instrument is fixed at a single position within the earth formations. A resulting drawback to the known methods for skin effect correction of induction logs is that they do not fully account for the skin effect on the induction receiver response within earth formations including layers having high contrast in the electrical conductivity from one layer to the next. If the skin effect is not accurately determined, then the induction receiver responses cannot be properly adjusted for skin effect, and as a result, the conductivity (resistivity) of the earth formations will not be precisely determined.

SUMMARY OF THE INVENTION

The invention is a method of adjusting induction receiver signals for skin effect in an induction logging instrument including a plurality of spaced apart receivers and a transmitter generating alternating magnetic fields at a plurality of frequencies. The method includes the steps of extrapolating measured magnitudes of the receiver signals at the plurality of frequencies, detected in response to alternating magnetic fields induced in media surrounding the instrument, to a response which would obtain at zero frequency. A model of conductivity distribution of the media surrounding the instrument is generated by inversion processing the extrapolated magnitudes. Magnitudes of the receiver responses at the plurality of frequencies are then synthesized based on the model of conductivity distribution. A difference between the synthesized magnitudes and the measured magnitudes is then determined. The difference is applied to the measured magnitudes to adjust them. The steps of generating the model based on the extrapolated adjusted magnitudes, synthesizing the response from the model and determining the difference are repeated until the difference represents less than a predetermined fraction of the extrapolated magnitudes.

In a preferred embodiment, the step of extrapolating the receiver magnitudes includes the following steps. A magnitude of the signals induced in each of the receiver coils is determined at each one of a plurality of different frequencies. A relationship of the magnitudes of the induced signals with respect to frequency is determined, and a skin effect corrected conductivity is determined by calculating a value of this relationship which would obtain when the frequency is equal to zero. The step of determining the relationship includes calculating a best fit curve of the signal magnitudes with respect to the frequency, calculating the first derivative of the best fit curve with respect to the frequency, and calculating a correction for the signal magnitude at a selected frequency according to the relationship of the first derivative with respect to the frequency. The correction is applied to the signal magnitude at the selected frequency to calculate a skin effect corrected signal magnitude.

DESCRIPTION OF THE PREFERRED EMBODIMENT

Figure 1:
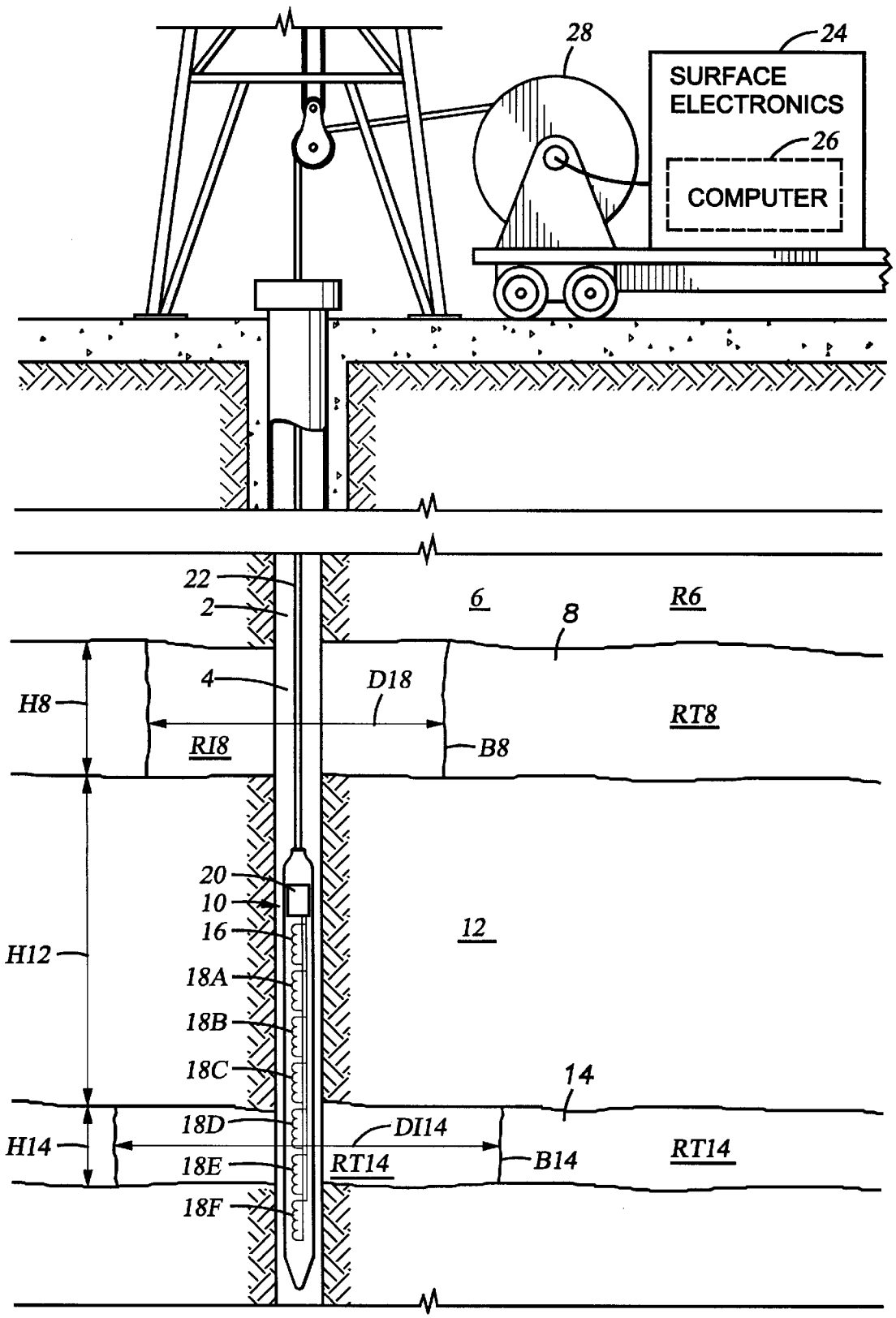
FIG. 1 shows an induction logging instrument as it is typically used to make measurements for use with the method of the invention.

FIG. 1 shows an induction well logging instrument 10 disposed in a wellbore 2 penetrating earth formations. The earth formations are shown generally at 6, 8, 12 and 14. The instrument 10 is typically lowered into the wellbore 2 at one end of an armored electrical cable 22, by means of a winch 28 or similar spooling device known in the art. An induction well logging instrument which will generate appropriate types of measurements for performing the process of the invention is described, for example, in U.S. Pat. No. 5,452, 761 issued to Beard et al. The instrument described in the Beard et al '761 patent is meant only to serve as an example, and is not meant to be an exclusive representation of induction well logging instruments which can generate measurements usable for performing the process of the invention. Using the instrument in the Beard et al '761 patent is therefore not to be construed as a limitation on the invention. The instrument described in Beard et al '761 patent, however, has certain advantages for use in performing the method of the invention which will be further explained.

The instrument 10 can include a telemetry/signal processing unit 20 (SPU). The SPU 20 can include a signal generator (not shown separately) which generates alternating current of a predetermined waveform. The alternating current is generally conducted through a transmitter coil 16 disposed on the instrument 10. Receiver coils 18A–18F can be disposed at axially spaced apart locations along the instrument 10. The SPU 20 can include receiver circuits (not shown separately) connected to the receiver coils 18A–18F for detecting voltages induced in each of the receiver coils 18A–18F. The SPU 20 can also impart signals to the cable 22 corresponding to the magnitude of the voltages induced in each of the receiver coils 18A–18F. It is to be understood that the number of transmitter and receiver coils, and the relative geometry of the transmitter and receiver coils shown in the instrument in FIG. 1 is not a limitation on the invention. It is to be further understood that the receiver coils shown in FIG. 1 can either be single coils or a type of receiver coil known in the art as "mutually balanced", wherein each receiver coil includes a primary coil (not shown separately) and a secondary coil (not shown separately) wound in series connection and in inverse polarity to the primary coil (not shown separately) so as to reduce the effect of direct induction from the transmitter coil 16.

As is known in the art, the alternating current passing through the transmitter coil 16 induces alternating magnetic fields in the earth formations 6, 8, 12, 14 surrounding the transmitter. The alternating magnetic fields in turn eddy currents in the earth formations 6, 8, 12, 14. The eddy currents correspond in magnitude both to the electrical conductivity of the earth formations 6, 8, 12, 14 and to the relative position of the particular earth formation with respect to the transmitter coil 16. The eddy currents in turn induce voltages in the receiver coils 18A–18F. The magnitude of these induced voltages depends on both the eddy current magnitude and the relative position of the earth formation with respect to the individual receiver coil 18A–18F.

The voltages induced in each receiver coil 18A–18F generally correspond to the apparent electrical conductivity of all of the media surrounding the instrument 10. The media include the earth formations 6, 8, 12 and 14 and the drilling mud 4 in the wellbore 2. The degree of correspondence between the voltages induced in a particular receiver coil, and the electrical conductivity of the particular earth formation axially disposed between the particular receiver coil and the transmitter coil 16, can depend on the vertical thickness of the particular earth formation, such as shown at H8 for earth formation 8. A more closely spaced receiver coil such as 18A would have more of its voltage induced by eddy currents flowing from entirely within a thinner formation such as 14 (having a thickness shown at H14), than would be the case for a longer spaced receiver coil such as 18F. Conversely, the eddy currents which induce the voltages in receiver coil 18A would more likely correspond to the conductivity within a zone such as shown at RI14, which is affected by fluid "invasion" into its pore spaces from the liquid phase of a fluid 4 used to drill the wellbore (commonly known as "drilling mud", the liquid phase known as "mud filtrate"). The radial distance from the center of the wellbore 2 to which the mud filtrate penetrates the particular earth formation can be different for each formation. A more deeply invaded zone DI14 in formation 14 is shown in comparison to a more shallow invaded zone DI8 in formation 8. Other formations, such as 6 and 12, may be substantially impermeable to fluid flow and therefore may not have invaded zones at all. The radial depth of invasion, such as DI8 or DI14, is typically not known at the time the instrument 10 is moved through the wellbore 2.

The signals corresponding to the voltages induced in each receiver coil 18A–18F can be transmitted along the cable 22 to surface electronics 24. The surface electronics 24 can include various detector circuits (not shown) for interpreting the signals from the instrument 10, and a computer 26 to perform the process of the invention on the signals transmitted thereto. It is to be understood that the SPU 20 could also be programmed to perform the process of the invention in the instrument 10 itself. Processing the receiver coil signals in the computer 26 is a matter of convenience for the system designer and is not to be construed as a limitation on the invention.

The degree of correspondence between the magnitude of the voltages induced in each receiver coil 18A–18F and the conductivity of the media surrounding the instrument 10 is affected by a phenomenon referred to as the "skin effect". A particular advantage of using an apparatus like the one disclosed in the Beard et al '761 patent as it relates to the invention, is that the transmitter coil 16 can be energized with alternating current having a plurality of different component frequencies, and the SPU as disclosed in Beard et al '761 is adapted to generate signals which can be interpreted so as to determine the magnitude of the induced voltages at each one of the plurality of different component frequencies.

The invention includes using the measured voltage response of the receiver coils 18A–18F at each component frequency to determine the response of the receiver coils 18A–18F which would obtain at an alternating current frequency equal to zero. In the present embodiment of the invention, the component frequencies can include 10, 30, 50, 70, 90, 110, 130 and 150 kilohertz (KHz), which as explained in the Beard et al '761 patent can be generated by energizing the transmitter coil with 10 KHz square wave current. It is to be understood that the number of component frequencies and the values of each component frequency selected for use in the present invention are a matter of convenience for the system designer and are not to be construed as a limitation on the present invention. The invention can perform as described herein using a smaller number of frequencies, or using different frequencies. Using eight frequencies as disclosed herein, however, provides a high degree of accuracy in determining the response of the receiver coils 18A–18F which would obtain at zero frequency. Typically the method of the invention will have improved accuracy when the number of component frequencies is increased, but the number of component frequencies used may be limited, as a practical matter, by the capability of the instrument 10 to generate and receive such frequencies.

Figure 2:
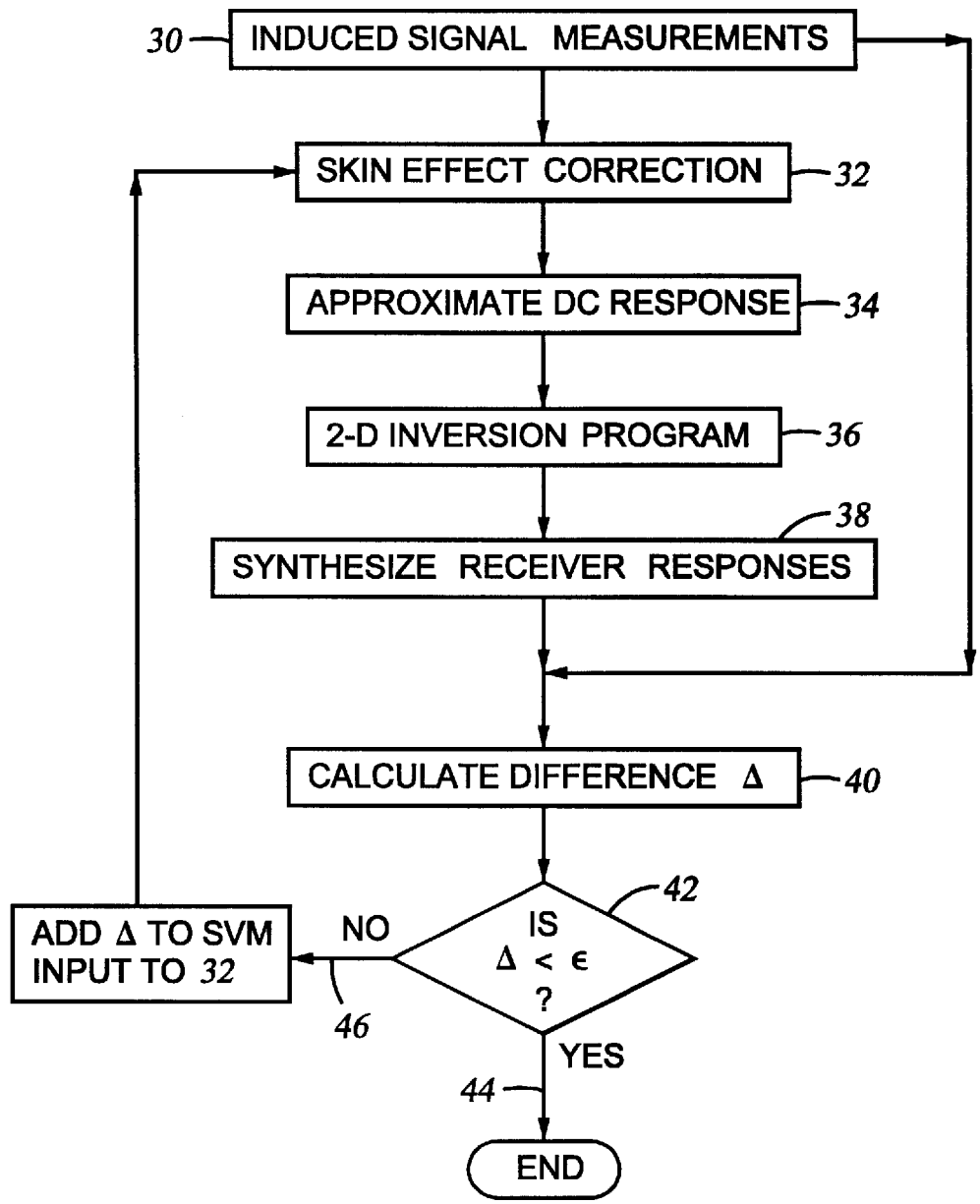
FIG. 2 shows a flow chart of one embodiment of the invention.

The first step in the process of the invention is to determine the induced receiver responses which would obtain, at any particular conductivity of the surrounding medium, if the frequency of the alternating current were equal to zero. This process is more commonly referred to as "skin effect correction". In FIG. 2, this is shown at 32. The receiver signal measurements (receiver responses) used as inputs for the skin effect correction are shown at 30 in FIG. 2. One method for estimating the receiver responses that would obtain at zero frequency is described, for example, in U.S. patent application Ser. No. 08/608,731 filed by Beard et al on Feb. 29, 1996 and entitled, "Method for Skin Effect Correction and Data Quality Verification for a Multi-Frequency Induction Well Logging Instrument". The method of correcting the receiver signals for skin effect as described therein can be generally described as including the following steps. A magnitude of the signals induced in each of the receiver coils is determined at each one of a plurality of different frequencies, which can be the same eight frequencies used in the induction logging instrument as described herein. A relationship of the magnitudes of the induced signals with respect to the frequency is determined, and a skin effect corrected apparent receiver response is determined, by calculating a value of this relationship which would obtain when the frequency is equal to zero. The step of determining the relationship includes calculating a best fit curve of the receiver signal magnitudes with respect to the frequency, calculating the first derivative of the best fit curve with respect to the frequency, and calculating a correction for the signal magnitude at a selected frequency according to the relationship of the first derivative with respect to the frequency. The correction is applied to the signal magnitude at the selected frequency to calculate a skin effect corrected signal magnitude. It is to be clearly understood that the method for determining skin effect corrected signal magnitudes as described in U.S. patent application Ser. No. 08/608,731 is not an exclusive representation of methods for determining skin effect corrected signal magnitudes which can be used with the invention. Another example of a skin effect correction method will be described later herein. The result of the skin effect correction is a set of apparent DC (zero frequency) responses for each receiver. This is shown in FIG. 2 at 34.

Having determined the skin-effect corrected receiver responses, the next step in the process of the invention is to determine a 2-dimensional model of the earth formations using a fast 2-D inversion processing routine, as shown at 36 in FIG. 2. One such 2-D inversion processing routine is described for example in applicants' co-pending U.S. patent application Ser. No. 08/598,443 filed on Feb. 8, 1996 and entitled, "Real time Two-Dimensional Inversion Process and its Application to Induction Resistivity Well Logging". The output of the inversion process described in the Ser. No. 08/598,443 patent application is a spatial distribution of electrical conductivities in the media surrounding the instrument which could result in the induced signals actually measured by receivers on the instrument.

It should be noted that the Ser. No. 08/598,443 patent application includes an alternative method for skin effect correction of the receiver responses which may also be used with the process of this invention as an alternative to the skin effect correction method previously described herein. This method can be described as follows. The electric field induced by a current loop disposed in a conductive medium can be described by the following integral equation:

$$E_\phi(r_0, z_0) = E_\phi^0(r_0, z_0) + \quad (1)$$

$$i\omega\mu \int_{-\infty}^{\infty} dz \int_{-\infty}^{\infty} dr (\sigma - \sigma_0) A_\phi(r_0, z_0 | r, z) E_\phi(r, z)$$

where $A_\phi$ represents the vector potential of an auxiliary current loop having 1 ampere of electrical current flowing within the loop. The loop is coaxial with the axis of symmetry and positioned in a plane having the vertical coordinate z and radius r. The derivation of equation (1) and a description of how to calculate the electric field of a current loop is described, for example in, P. A. Eaton, "3D Electromagnetic Inversion Using Integral Equations", Geophysical Prospecting, Vol. 37, pp 407–426, 1989. The so-called "background conductivity" $\sigma_0$ is typically selected to facilitate calculation of the primary electric field $E_\phi^0(r_0, z_0)$. For example, the background conductivity can be selected to represent a substantially homogeneous medium having uniform spatial distribution of conductivity.

The vector potential of the current loop may be expressed as a Taylor expansion as shown in the following expression:

$$A_\phi = \sum_{k=0}^{k=\infty} a_{k/2}(-i\omega)^{k/2} \quad (2)$$

From the formula for the vector potential, it can be determined that $a_{1/2}=0$. A Taylor expansion may also be shown for the primary electric field based on the Taylor expansion for the vector potential of the auxiliary current loop. The Taylor expansion for the primary electric field can be shown by the expression:

$$E_\phi^0 = \sum_{k=2}^{k=\infty} e_{k/2}(-i\omega)^{k/2}; \quad e_{3/2}^0 = 0 \quad (3)$$

By substitution of the Taylor expansions for the vector potential of the auxiliary current loop and for the primary electric field, an expression for the electric field can be shown by the expression:

$$E_\phi = \sum_{k=2}^{k=\infty} e_{k/2}(-i\omega)^{k/2} \quad (4)$$

$$.$$
$$.$$
$$.$$

$$e_1 = e_1^0$$

$$.$$
$$.$$
$$.$$

$$e_{3/2} = 0$$

$$.$$
$$.$$
$$.$$

$$e_{5/2} = e_{5/2}^0$$

The vertical component of the magnetic field can be determined by Maxwell's equations as in the following expression:

$$H_z = \frac{1}{i\omega\mu} \frac{1}{r_0} \frac{\partial}{\partial r_0} (r_0 E_\phi) \quad (5)$$

and by substitution into the Taylor expansions for the electric field can be shown as:

$$H_z = \sum_{k=0}^{k=\infty} \Theta_{k/2}(-i\omega)^{k/2} \quad (6)$$

$$\Theta_{1/2} = 0$$

$$\Theta_{3/2} = \Theta_{3/2}^0$$

The term in equation (6) which is proportional to $\omega^{3/2}$ is generated by the primary field and is not affected by any inhomogeneities in the media surrounding the instrument (10 in FIG. 1). The voltages induced in the receiver coils (18A–18F in FIG. 1) generally correspond to the imaginary component of the magnetic field, which can be shown in the following Taylor expansion:

$$\Im[H_z] = \sum_{k=2}^{k=\infty} \Theta_{k/2}^{\Im} \omega^{k/2} \quad (7)$$

$$\Theta_{2j} = 0; \quad j = 1, 2, \ldots,$$

Finally, an expression for the apparent conductivity can be shown as:

$$\sigma_a = \frac{\Im[H_z]}{K} \quad (8)$$

where K represents a constant related to the frequency $\omega$ and the geometry of the transmitter (16 in FIG. 1) and each of the receiver coils (18A–18F in FIG. 1). The apparent conductivity for each receiver coil can therefore be represented by the following Taylor expansion:

$$\sigma_a = \sum_{k=0}^{k=\infty} s_{k/2} \omega^{k/2} \quad (9)$$

$$s_{2j-1} = 0; \quad j = 1, 2, \ldots,$$

The Taylor expansion in equation (9) for the apparent conductivity, $\sigma_a$ can be calculated as shown in the following expression:

$$\begin{bmatrix} \sigma_a(\omega_1) \\ \sigma_a(\omega_2) \\ \cdot \\ \cdot \\ \cdot \\ \sigma_a(\omega_{m-1}) \\ \sigma_a(\omega_m) \end{bmatrix} = \begin{bmatrix} 1 & \omega_1^{1/2} & \omega_1^{3/2} & \ldots & \omega_1^{n/2} \\ 1 & \omega_2^{1/2} & \omega_2^{3/2} & \ldots & \omega_2^{n/2} \\ \ldots & \ldots & \ldots & \ldots & \ldots \\ \ldots & \ldots & \ldots & \ldots & \ldots \\ 1 & \omega_{m-1}^{1/2} & \omega_{m-1}^{3/2} & \ldots & \omega_{m-1}^{n/2} \\ 1 & \omega_m^{1/2} & \omega_m^{3/2} & \ldots & \omega_m^{n/2} \end{bmatrix} \begin{bmatrix} s_0 \\ s_{1/2} \\ s_{3/2} \\ \cdot \\ \cdot \\ \cdot \\ s_{n/2} \end{bmatrix} \quad (10)$$

where m represents the number of component frequencies (which in the present embodiment, as previously explained, can be equal to eight), and n can be selected from a Taylor series expansion for an apparent conductivity integral.

The ultimate objective of the expansion series in equation (10) is to solve for the coefficient at the zero-frequency limit—$s_0$. Solving a system according to equation (10) will calculate a receiver coil response approximately equal to that described in H. G. Doll, "Introduction to Induction Logging and Application to Logging Wells Drilled with Oil Base Mud", AIME Transactions Vol. 1, No. 6, pp 148–162 (1949), for the zero frequency limit of the apparent conductivity at each one of the receiver coils (18A–18F in FIG. 1). The output of this alternative method of performing skin effect correction is a set of apparent DC receiver responses, again shown at 34 in FIG. 2.

The 2-dimensional inversion process described in the Ser. No. 08/598,443 application requires as one of its inputs a set of induction receiver responses which would obtain at a frequency equal to zero. These responses, as previously explained, can be calculated by either of the methods described herein. Generally, the 2-dimensional inversion process described in the Ser. No. 08/598,443 application includes generating an initial model of the media surrounding the instrument 10. Conductivities of elements in the model are adjusted so that a measure of misfit between the skin-effect corrected receiver responses and a set of simulated receiver responses, based on the model, is minimized. The geometry of the model is then adjusted so that the measure of misfit between the skin-effect corrected receiver responses and the simulated receiver responses, based on the model, is further minimized.

After a suitable model of the spatial distribution of the conductivity of the medial surrounding the instrument is generated, a set of synthetic receiver responses can be generated, for each receiver coil 18A–18F on the instrument, at each component frequency in the original set of measured receiver signals. This step is shown at 38 in FIG. 2. A method for generating such synthetic receiver responses at each component frequency is described, for example, in T. Tamarchenko and L. Tabarovsky, "Fast Frequency Domain Electromagnetic Modeling in Axially Symmetric Layered Media", Radio Science, vol. 29, No. 4, pp. 979–992, July–August 1994. The result of the process described in the Tamarchenko et al reference is a synthetic "well log" including, for each axial position of the instrument 10 in the wellbore 2, the signals which would be induced in each receiver coil 18A–18F at each component frequency as a result of earth formations having spatial distribution of electrical conductivity as in the 2-dimensional model generated in the previous step of the invention.

The synthesized signals are then compared with the measured receiver signals at each component frequency. This step is shown at 40 in FIG. 2. The step of comparing can be taking a simple difference $\Delta^1$ between the measured induced signals $\sigma_a(\omega, z)$ (indicated as being made at each component frequency $\omega$ and at each axial position z of the instrument in the wellbore) and the synthesized signals $\sigma^1_s(\omega, z)$:

$$\Delta^1(\omega,z) = \sigma_a(\omega,z) - \sigma_s^1(\omega,z) \quad (11)$$

The difference is compared, shown at 42 in FIG. 2, to a predetermined threshold which will be further explained. If the difference exceeds the threshold, shown at 46, then the magnitude of the measured signals $\sigma_a(\omega, z)$ can be adjusted by adding to them the difference $\Delta^1$ to generate a new set of inputs $\sigma^1 a(\omega, z)$ to be applied to the skin effect correction step 34 described previously herein.

After the skin effect correction is applied to the new set of inputs $\sigma^1 a(\omega, z)$, a new set of inputs (as approximate DC receiver responses) to the 2-dimensional modeling program $\sigma^1 a(\omega=0, z)$ is generated. This new set of inputs $\sigma^1_a(\omega=0, z)$ is then used to generate a second 2-dimensional model of the spatial distribution of the conductivities. The second 2-dimensional mode is in turn used to generate a second set of synthetic receiver signals $\sigma^2 s(\omega, z)$. The second set of synthetic receiver signals is then compared to the originally measured receiver signals $\sigma_a(\omega, z)$ to generate a second difference $\Delta^2(\omega, z)$. The second difference is applied to the prewious set of adjusted measured receiver signals $\sigma^1_a(\omega, z)$ to generate new inputs to the skin effect correction routine $\sigma^2_a(\omega, z)$.

This entire process can be repeated until the difference (nominally the i-th difference) $\Delta^i(\omega, z)$ as a fraction of the latest set of adjusted receiver signals $\sigma^i_a(\omega, z)$ becomes smaller than a predetermined threshold $\epsilon$:

$$\frac{\Delta^i(\omega, z)}{\sigma_a^i(\omega, z)} \leq \epsilon \tag{12}$$

The predetermined threshold $\epsilon$ is typically equal to the accuracy of the instrument (about 1 to 2%). This is shown at 44 in FIG. 2.

The result is a set of apparent receiver responses $\sigma^i_a(\omega=0, z)$ which more closely represent the apparent receiver signals which would obtain at a frequency of zero than was possible with the skin-effect correction methods of the prior art.

DESCRIPTION OF AN ALTERNATIVE EMBODIMENT

Figure 3:
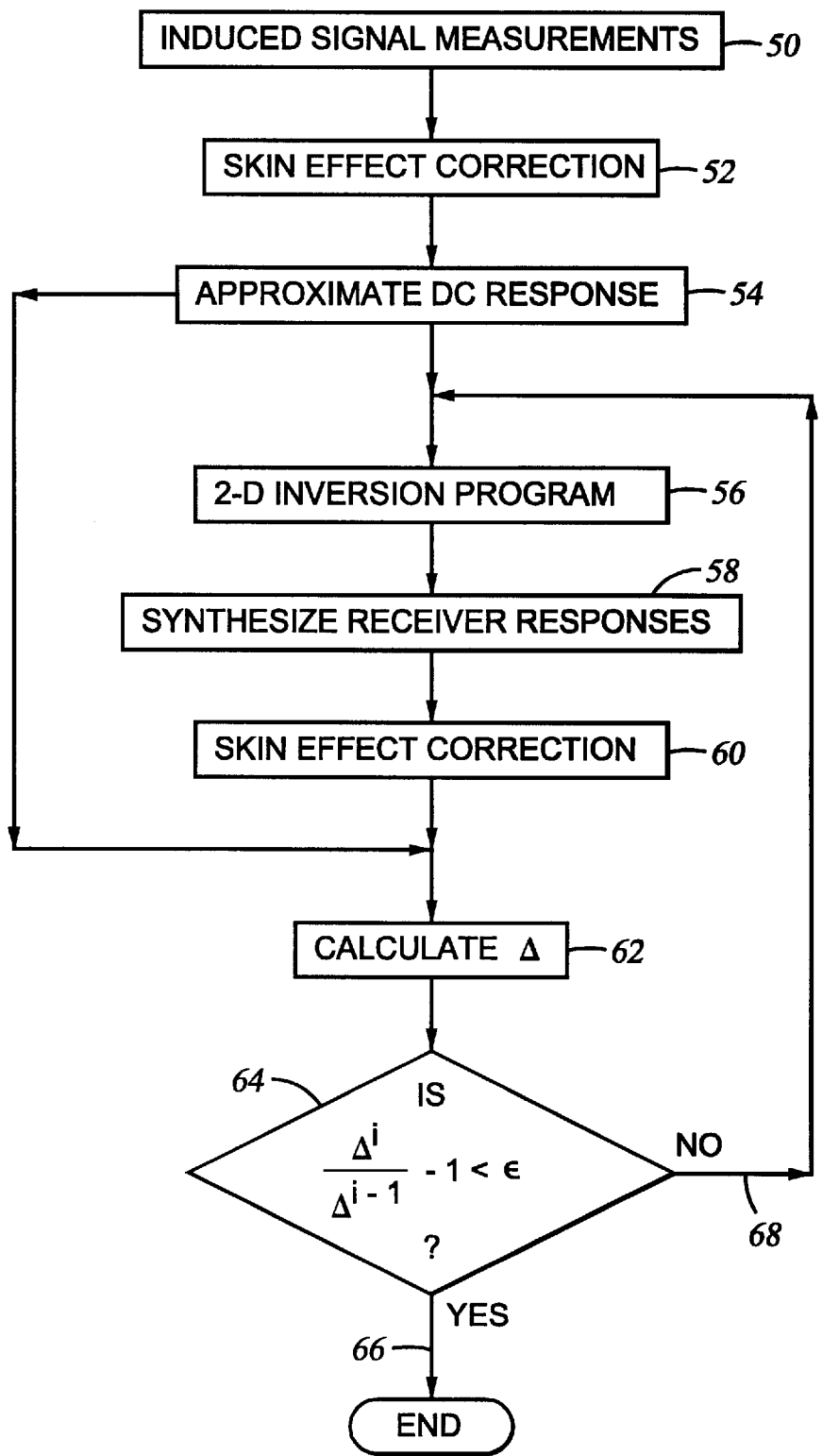
FIG. 3 shows a flow chart of an alternative embodiment of the invention.

Alternatively, skin effect corrected receiver responses can be calculated by the following method. First, induction voltage signals are measured at a plurality of frequencies, just as in the first embodiment of the invention. This is shown at 50 in FIG. 3.

Skin effect correction is then applied to the measured receiver signals, shown at 52. The skin effect correction method can be either of the alternative methods described in the first embodiment of the invention. The result, shown at 54, is a set of the approximate DC receiver responses.

Next, a 2-dimensional model of the earth formations is generated, shown at 56, using the modeling routine described in the first embodiment of the invention. Using the 2-dimensional model of the conductivity distribution, a set of synthetic receiver responses is generated, shown at 58, using the method described in the Tamarchenko et al reference cited in the first embodiment of the invention.

The resulting synthetic receiver responses can then have skin effect correction applied to them directly, as shown at 60. The skin effect correction method can be either of the alternative methods as described in the first embodiment of the invention. The result of the skin effect correction is a set of receiver responses which would obtain at a frequency of zero. The output of the step of skin effect correction of the synthetic receiver responses is then compared to the output of the step of skin effect correction of the measured receiver responses. A difference $\Delta$ is determined, shown at 62, between the two sets of skin effect corrected responses.

In a first pass-through of this embodiment of the invention, the difference $\Delta$ thus calculated is used to adjust the skin effect corrected measured receiver responses determined earlier, as shown at 68. The adjusted skin effect corrected measured receiver responses are used to again generate a 2-dimensional model, at 56. The process is repeated until the difference determined between the successive iterations $\Delta^{i-1}$, $\Delta^i$ of this process become substantially equal. This is shown in decision box 64 as convergence of the successive differences. The difference $\Delta$ will not converge towards zero with each successive step of the process because of the inherent error in the skin effect correction process itself. This can be shown as:

$$\lim_{i \to \infty} \left[ \frac{\Delta^i}{\Delta^{i-1}} \right] - 1 \to 0 \tag{13}$$

More typically, the ratio of the differences will be determined to have reached a useful limit when the ratio less one is below a predetermined threshold $\epsilon$ which is typically set to the accuracy of the instrument (typically about 1–2 percent as in the first embodiment of the invention). As shown here, the threshold criterion is satisfied when:

$$\frac{\Delta^i}{\Delta^{i-1}} - 1 < \epsilon \tag{14}$$

Presuming the latest iteration of the process produces a difference sufficiently close to the difference determined in the preceding iteration of this process, then the process can be halted, at 66. The result at the termination of the process is a set of appropriately skin effect corrected receiver responses.

Those skilled in the art will devise other embodiments of the invention which do not depart from the spirit of the invention as disclosed herein. Accordingly the invention should be limited in scope only by the attached claims.

What is claimed is:

1. A method of adjusting induction receiver signals for skin effect, in an induction logging instrument including a plurality of spaced apart receivers and a transmitter generating alternating magnetic fields in media surrounding said instrument at a plurality of frequencies, the method comprising:

extrapolating magnitudes of said receiver signals at said plurality of frequencies, detected in response to said alternating magnetic fields induced in said media, to a response which would obtain at zero frequency;

generating a model of conductivity distribution in said media by inversion processing said extrapolated magnitudes;

synthesizing magnitudes of said receiver responses at said plurality of frequencies based on said model of conductivity distribution;

determining a difference between said magnitudes of said receiver signals and said synthetic magnitudes;

adjusting said magnitudes of said receiver signals by said difference; and repeating said steps of extrapolating, generating said model based on said extrapolated magnitudes, synthesizing said magnitudes and determining said difference until said difference represents less than a predetermined fraction of said magnitudes detected in response.

2. The method as defined in claim 1 wherein said step of extrapolating said magnitudes comprises:

determining said magnitude of said signals at each one of said plurality of frequencies;

determining a relationship of said magnitudes with respect to frequency; and calculating a skin effect corrected conductivity by calculating a value of said relationship which would obtain when said frequency is equal to zero.

3. The method as defined in claim 2 wherein said step of determining said relationship includes calculating a best fit curve of the said magnitudes with respect to said frequency, calculating a first derivative of said best fit curve with respect to said frequency, and calculating a correction for said voltage magnitude at a selected frequency according to a relationship of said first derivative with respect to said frequency.

4. The method as defined in claim 1 wherein said predetermined fraction is substantially equal to an accuracy of said induction instrument.

5. The method as defined in claim 1 wherein said step of extrapolating said magnitudes to zero frequency includes solving a system of fractional polynomial equations with respect to said frequency.

6. A method of adjusting induction receiver signals for skin effect, in an induction logging instrument including a plurality of spaced apart receivers and a transmitter generating alternating magnetic fields in media surrounding said instrument at a plurality of frequencies, the method comprising:

extrapolating magnitudes of said receiver signals at said plurality of frequencies, detected in response to said alternating magnetic fields induced in said media, to a response which would obtain at zero frequency;

generating a model of conductivity distribution in said media by inversion processing said extrapolated magnitudes;

synthesizing magnitudes of said receiver responses at said plurality of frequencies based on said model of conductivity distribution;

extrapolating said synthesized magnitudes to a response which would obtain at zero frequency;

determining a difference between said extrapolated magnitudes and said extrapolated synthesized magnitudes;

adjusting said extrapolated magnitudes by said difference; and repeating said steps generating said model based and determining said difference until said difference does not substantially change between successive iterations.

7. The method as defined in claim 6 wherein said step of extrapolating said magnitudes comprises:

determining said magnitude of said signals at each one of said plurality of frequencies;

determining a relationship of said magnitudes with respect to frequency; and calculating a skin effect corrected conductivity by calculating a value of said relationship which would obtain when said frequency is equal to zero.

8. The method as defined in claim 7 wherein said step of determining said relationship includes calculating a best fit curve of the said magnitudes with respect to said frequency, calculating a first derivative of said best fit curve with respect to said frequency, and calculating a correction for said voltage magnitude at a selected frequency according to a relationship of said first derivative with respect to said frequency.

9. The method as defined in claim 6 wherein said predetermined fraction is substantially equal to an accuracy of said induction instrument.

10. The method as defined in claim 6 wherein said step of extrapolating said magnitudes to zero frequency includes solving a system of fractional polynomial equations with respect to said frequency.

* * * * *